United States Patent [19]

Kukolja et al.

[11] 3,880,872

[45] Apr. 29, 1975

[54] PROCESS FOR PREPARING THIAZOLINE AZETIDINONES

[75] Inventors: Stjepan Kukolja, Indianapolis; Steven R. Lammert, Greenwood, both of Ind.

[73] Assignee: Eli Lilly and Company, Indianapolis, Ind.

[22] Filed: May 16, 1974

[21] Appl. No.: 470,501

Related U.S. Application Data

[62] Division of Ser. No. 182,556, Sept. 21, 1971, Pat. No. 3,832,347.

[52] U.S. Cl. ............................................. 260/306.7 C
[51] Int. Cl. ....................... C07d 91/42; C07d 99/10
[58] Field of Search .............................. 260/306.7 C

[56] References Cited
UNITED STATES PATENTS
3,681,380  8/1972  Cooper ........................ 260/306.7 C

*Primary Examiner*—Alton D. Rollins
*Attorney, Agent, or Firm*—William C. Martens, Jr.; Everet F. Smith

[57] ABSTRACT

Imino halides of 3-amido-2-halo-1-(1'-protected carboxy-2'-methyl-1'-propenyl)-4-azetidinones, and a process for preparing bicyclic thiazoline azetidinones by reacting the above imino halides with hydrogen sulfide or a thioalkanoate ion in the presence of a base in an aprotic solvent. The thiazoline azetidinone compounds are useful in processes for making amido-thiazole compounds which are useful as antibacterial and antifungal agents.

4 Claims, No Drawings

PROCESS FOR PREPARING THIAZOLINE AZETIDINONES

This is a division of application Ser. No. 182,556, filed Sept. 21, 1971 now U.S. Pat. No. 3,832,347 issued Aug. 27, 1974.

INTRODUCTION

This invention relates to new 4-azetidinone derivatives. More particularly this invention provides some new imino-halides of 2-halo-3-amido-1-(1'-protected carboxy-2'-methyl-1'-propenyl)-4-azetidinones and a process for using imino halides of this type to form bicyclic thiazoline azetidinone compounds which are known to be useful as intermediates in processes for preparing amidothiazole compounds which are useful as antibacterial and antifungal substances.

BACKGROUND OF THE INVENTION

In U.S. Pat. No. 3,840,556 there are described and claimed some compounds of the formula

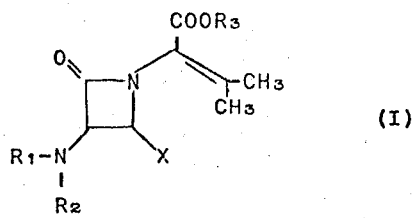

wherein $R_1$ is an acyl group selected from the group consisting of a group of the formula

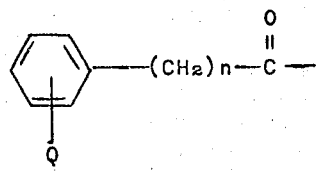

wherein Q is selected from the group consisting of hydrogen and one or more substituents selected from the group consisting of $C_1$ to $C_3$ alkyl, $C_1$ to $C_3$ alkoxy, nitro, halogen, carboxy and trifluoromethyl and $n$ is zero or an integer from 1 to 5; a group of the formula

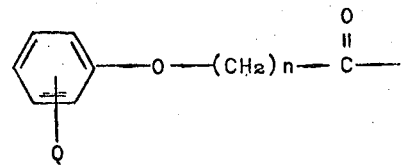

wherein Q and n are as defined above; a group of the formula

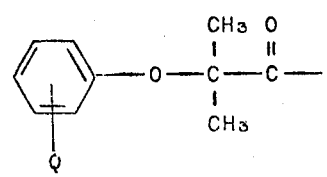

wherein Q is as defined above; and, a group of the formula

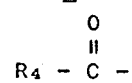

wherein $R_4$ is hydrogen or $C_1$ or $C_6$ alkyl;
$R_2$ is hydrogen,
or, $R_1$ and $R_2$, together with the nitrogen atom to which they are bonded define an imido group selected from the group consisting of phthalimido and succinimido;
$R_3$ is selected from the group consisting of $C_1$–$C_4$ alkyl, trichloroethyl, benzyl, p-nitrobenzyl, p-methoxybenzyl, benzhydryl, phthalimidomethyl and phenacyl; and,
X is selected from the group consisting of chloro, bromo and $C_2$ to $C_6$ alkanoyloxy.

Compounds of that type are prepared by reacting a penicillin ester with a source of positive halogen, e.g., elemental chlorine, in a molar ratio of the source of positive halogen to the penicillin ester greater than 1.75 in an aprotic solvent. The reaction therein involves a selective opening of the $S_1$–$C_5$ bond of the thiazolidine ring moiety of the penicillin ester.

In U.S. Pat. No. 3,594,389, Robin D. G. Cooper describes and claims some new substituted thiazoles which are useful as antibiotics and antifungal agents. Cooper prepared those compounds by treating a thiazoline azetidinone with an acid or a base to open the β-lactam ring. The thiazoline azetidinone was obtained by treatment of a penicillin sulfoxide with triphenyl phosphine or a trialkyl phosphite. In U.S. Pat. No. 3,705,892, Robin D. G. Cooper claimed the new thiazoline azetidinone compounds. These thiazoline azetidinone compounds have some antibacterial and antifungal activity of their own. They are also of interest for use in synthetic chemical processes for preparing amido-thiazole antibacterial and antifungal substances.

It is an object of this invention to provide some new imino-halide compounds which are useful for making thiazoline azetidinones.

It is another object of this invention to provide a new process for making thiazoline azetidinone compounds.

It is a more specific object of this invention to provide new imino halides of 3-amido-2-halo-1-(1'-esterified-carboxyl-2'-methyl-1'-propenyl)-4-azetidinones, and a process for converting imino halides of this type to thiazoline azetidinone esters.

SUMMARY OF THE INVENTION

By this invention, we have discovered that new, readily isolatable, imino halides of the formula

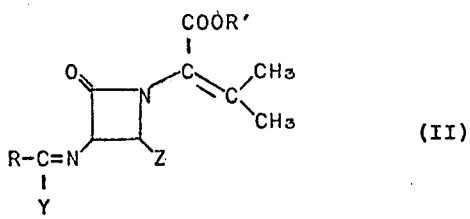

can be prepared by treating a compound of the formula

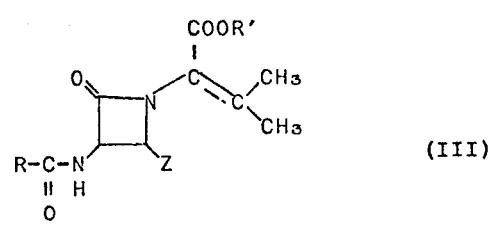

wherein, in the above formulae, R, R', Y and Z are as defined below, with phosphorus pentachloride, or an equivalent halogenating agent, in the presence of a hydrogen halide absorber in an aprotic liquid solvent at a temperature below about 30°C. The imino halides are used in a new process for preparing bicyclic thiazoline azetidinone compounds of the formula

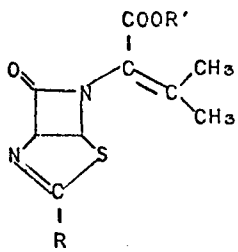

(IV)

wherein R and R' are as defined below by treatment of the imino halide with hydrogen sulfide or a thioalkanoyl radical in the presence of a base in an aprotic liquid solvent at a temperature below about 70°C. These new bicyclo thiazoline azetidinone compounds (which can also be named as 2,6-diaza-4-thiabicyclo[3.2.0]-hept-2-en-7-one derivatives) are useful in the treatment of plant fungus diseases such as Fusarium Root Rot, and as an antibiotic against the fungus *Botrytis cinerea*. They are also useful as intermediates in processes for preparing thiazoles of the formula

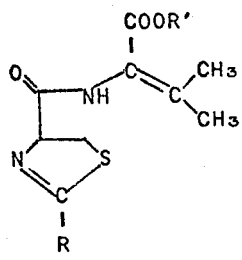

(V)

wherein R and R' are defined hereinbelow. Those thiazole compounds are claimed by Cooper in his U.S. Pat. No. 3,594,389, issued July 20, 1971. The thiazoles are useful an antibiotics against fungi and bacteria.

DETAILED DESCRIPTION OF THE INVENTION

This invention provides imino halides of formula II above where R is
a. $C_1$ to $C_8$-alkyl,
b. $C_3$ to $C_8$-cycloalkyl,
c. $C_2$ to $C_8$-alkenyl,
d. one of the above alkyl, cycloalkyl, or alkenyl groups substituted with $C_1$ to $C_3$-alkyloxy, chlorine, bromine, cyano, or carbo-$C_1$ to $C_3$-alkyloxy;
e.

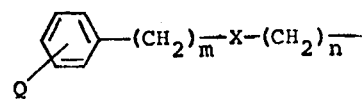

or

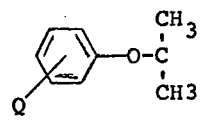

wherein in each such group Q is hydrogen, chloro, bromo, $C_1$ to $C_3$-alkyl, $C_1$ to $C_3$-alkyloxy, nitro or cyano; and X is oxygen or a carbon to carbon bond, m is an integer of from 0 to 2, and n is an integer of from 1 to 2;
Z is chlorine or bromine; and
R' is $C_1$ to $C_4$-normal or iso-alkyl, $C_4$ to $C_6$-tert-alkyl, $C_5$ to $C_8$-tert-alkenyl, $C_5$ to $C_8$-tert-alkynyl, benzyl, methoxybenzyl, nitrobenzyl, benzhydryl, phthalimidomethyl, succinimidomethyl, phenacyl, 2,2,2-trichloroethyl or methoxymethyl.

These imino halides are prepared by treating a compound of formula III wherein R and R' are as defined above and Y is chlorine or bromine, with a halogenating agent such as phosphorus pentachloride, phosphorus pentabromide, or the like under substantially anhydrous conditions in the presence of an acid binding agent such as a tertiary amine, e.g., quinoline, pyridine, dimethylaniline, or diethylaniline. The formation of the imino-halide (formula II) is preferably effected in an inert organic solvent such as methylene chloride, dichloroethane, chloroform, carbon tetrachloride, tetrachloroethane, nitromethane, diethyl ether, and the like, preferably at temperatures below 0°C., such as −10°C. to −76°C.

The compounds of formula III which are used to prepare these new imino halides (II) can be obtained by treating a 6-acylamino penicillin ester with a source of positive halogen in an aprotic solvent. That process is claimed in Kukolja U.S. Pat. No. 3,832,347. Briefly, by that process, the penicillin ester is treated with the source of positive halogen such as chlorine, bromine, mixed halogens, sulfuryl chloride, sulfuryl bromide, N-halogenamides and N-chlorobenzotriazole and alkanoyl hypohalides to effect selective cleavage or opening of the thiazolidene ring moiety of the penicillin at the $S_1$–$C_5$ bond, and the resulting formation of a compound of formula III, when the mole ratio of the source of positive halogen to the penicillin ester is greater than 1.5. It is preferred that this mole ratio be greater than 2 for most efficient production of the compounds of formula III. A detailed example for the preparation of such starting materials appears in Example 1, part A, below.

As the penicillin ester starting material, use is preferably made of 6-acylamido penicillin esters of the formula

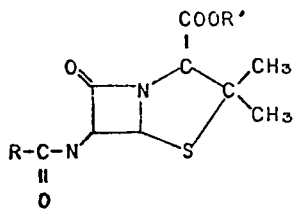

wherein R and R' are as defined above. However, as will be appreciated by those skilled in the art, since R amd R' do not enter into the reaction, R and R' can be a number of other groups in addition to those described above.

For convenience, the starting materials for use in the present invention are named by the use of the "penam" nomenclature system described by Sheehan et al., *Journal of the American Chemical Society*, 75, 3292 (footnote 2) (1953). In accordance with this system, "penam" refers to the following saturated ring system:

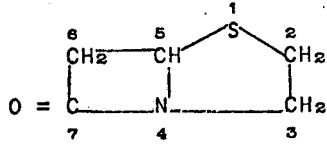

Thus, penicillin V (i.e., phenoxymethyl penicillin) has the structure

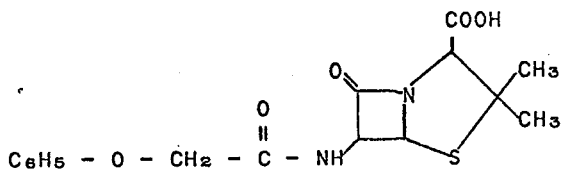

and can be named 6-phenoxyacetamido-2,2-dimethylpenam-3-carboxylic acid.

Representative penicillin esters which can be used as starting materials for preparing the imino halide and thiazoline azetidine products of this invention include Methyl 6-acetamido-2,2-dimethylpenam-3-carboxylate, sec-Butyl 6-octanoylamido-2,2-dimethylpenam-3-carboxylate, Propyl 6-cyclohexylacetamido-2,2-dimethylpenam-3-carboxylate, tert-Butyl 6-propenoylamido-2,2-dimethylpenam-3-carboxylate, tert-Pentenyl 6-heptenoylamido-2,2-dimethyl-3-carboxylate, tert-Pentynyl 6-(2'-chloropropionoylamido-2,2-dimethyl-3-carboxylate, p-Nitrobenzyl 6-(phenoxyacetamido)-2,2-dimethylpenam-3-carboxylate, Succinimidomethyl 6-(4'-methylphenyl acetamido)-2,2-dimethylpenam-3-carboxylate, Phthalimidomethyl 6-(3'-bromophenyl isopropionoylamido)-2,2-dimethylpenam-3-carboxylate, 2,2,2-Trichloroethyl 6-(phenylacetamido)-2,2-dimethylpenam-3-carboxylate, Phenacyl 6-(3'-carbomethoxyphenylacetamido)-2,2-dimethylpenam-3-carboxylate, Methoxymethyl 6-acetamido-2,2-dimethylpenam-3-carboxylate, and the like.

These new imino halides are useful as intermediates in the process for preparing thiazoline azetidinones according to the process of this invention. In this new process a compound of the formula (IV) wherein R is $C_1$ to $C_8$-alkyl, $C_3$ to $C_8$-cycloalkyl, $C_2$ to $C_8$-alkenyl, optionally substituted with $C_1$ to $C_3$-alkyloxy, $C_1$ to $C_3$ halo, or cyano, hydrogen, carbo-$C_1$ to $C_3$-alkyloxy, $C_1$ to $C_4$-alkyloxy,

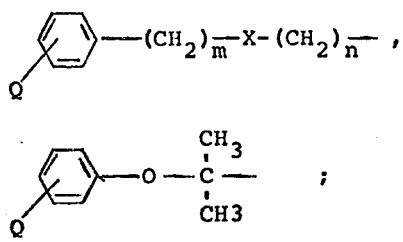

Q is hydrogen, chloro, bromo, $C_1$ to $C_3$-alkyl, $C_1$ to $C_3$-alkyloxy, nitro, or cyano;

X is oxygen or a carbon to carbon bond;

$m$ is an integer of from 0 to 2;

$n$ is an integer of from 1 to 2;

R' is hydrogen, $C_1$ to $C_4$-normal or iso-alkyl, $C_4$ to $C_6$-tert-alkyl, $C_5$ to $C_8$-tert-alkenyl, $C_5$ to $C_8$-tert-alkynyl, benzyl, methoxybenzyl, nitrobenzyl, benzhydryl, phthalimidomethyl succinimidomethyl, phenacyl, trichloroethyl or methoxymethyl is prepared by treating a compound of the formula (II) wherein R and R' are as defined above and Z is chlorine or bromine with hydrogen sulfide or a thioalkanoyl radical in the presence of a base in an aprotic solvent at a temperature below about 70°C.

If hydrogen sulfide is the selected bivalent sulfur supplying material, it can be bubbled into the liquid reaction medium containing the compound of formula II and a basic material. Alternatively, it can be supplied as an alkali metal salt thereof, e.g. Na—SH or K—SH. A molar ratio of at least 2 moles of base to 1 mole of hydrogen sulfide should be used. Alkali metal hydroxides, or basic salts such as sodium hydroxide, potassium hydroxide, sodium carbonate, potassium carbonate can be used.

In place of part or all of the hydrogen sulfide, a source of thioalkanoate [HS—C(O)—R''] ions can be used. The preferred thioalkanoate ions are those wherein R'' is an alkyl group having from 1 to 12 carbon atoms. The thioalkanoate ion can be supplied to the medium as the acid or as a salt thereof such as the sodium or potassium salts of thioformic, thioacetic, thiopropionic, thiobutyric, thiopentanoic, thiohexanoic, thioheptanoic, thiooctanoic, thiodecanoic, thiododecanoic acids. Other bases which can be used in the reaction mixture include ammonia, and methylammonium, dimethylammonium, trimethylammonium cationic salts of weak acids.

The reaction is conducted in an aprotic solvent such as methylene chloride, chloroform, carbon tetrachloride, tetrahydrofuran, N,N-dimethylformamide, dimethylsulfoxide, benzene, toluene, xylene, heptane, dioxane, and the like.

The reaction can be conducted in the liquid state at temperatures below about 70°C., preferably below 50°C. Above 70°C., the yields are lower and the reaction product becomes complex.

When the reaction is completed the thiazoline azetidinone product can be separated from the mixture by conventional means. If the hydrohalide salt of the base is filterable, it is separated e.g., by filtration or centrifugation. The filtrate can then be evaporated to remove the solvent and the residue can be dissolved in a solvent such as ethyl acetate or benzene, and chromatographed to purify the product. These products have been obtained as oils but some of them may be obtainable as amorphous or crystalline solids depending on the solvent systems and the degree of purity. Separation of the products over silica gel column using a benzene/ethylacetate mixture as an eluant, and fractionating the liquid products has permitted the obtaining of the products as oils. Spectral data were consistent with the indicated structures.

The thiazoline azetidinone esters of this invention are useful for making the acids, by conventional de-esterification procedures. The esters may be de-esterified by treatment thereof with mild acid such as trifluoroacetic acid, zinc in formic, acetic, or hydrochloric acid for a few minutes, or by hydrogenating the ester in the presence of a palladium or platinum catalyst on a barium sulfate or carbon carrier at autogeneous pressure. The thiazoline azetidinone acids and some of the esters are useful in the treatment of plant diseases. For example, the trichloroethyl ester and the acid having the structure of formula IV where R is phenoxymethyl and R' is hydrogen or trichloroethyl are active against Fusarium Root Rot. This activity is demonstrated by applying the compound at a broadcast rate of 40 pounds per acre to Fusarium infested soil and then planting Bountiful variety bean seeds in the soil. After 14 days, the bean plants are found to be free of the disease. In addition, the compounds of this invention are useful as antibiotics or in processes for preparing antibiotics. For example, the above trichloroethyl thiazoline azetidinone is active against the fungus *Botrytis cinerea* at a concentration of 100 micrograms/-milliliter as determined by an agar dilution test method described by Steers and Foltz, in *Antibiotics and Chemotherapy*, 9, p. 307, (1959).

In addition, the compounds of this invention are useful as intermediates for the preparation of thiazoles of the formula

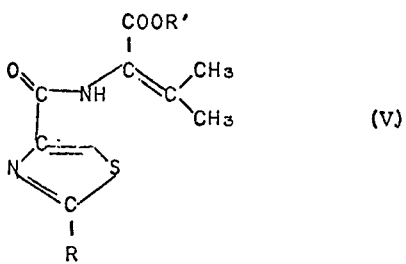

wherein R and R' are as defined above, by treatment of the thiazoline azetidinone of this invention with either acid or base within the range of 0° to 100°C. for from 3 to 24 hours. The reaction is slow at room temperature and below, so that long reaction times are necessary at these temperatures. At the higher temperatures, shorter reaction times may be used. The reaction is preferably carried out in an inert solvent such as benzene, tetrahydrofuran, dimethylsulfoxide or dimethylformamide. It is also possible to use acetic acid as solvent.

The base to be used in cleaving the β-lactam ring is an inorganic base that is a good nucleophile. Such a base is an alkali metal salt of a weak acid having a dissociation constant of less than $10^{-4}$, an alkali metal alkoxide wherein the alkoxy group contains from one to four carbon atoms, an alkali metal hydroxide or an alkaline earth metal hydroxide. Examples include sodium acetate, potassium carbonate, sodium bicarbonate, sodium methoxide, lithium ethoxide, potassium butoxide, sodium hydroxide, potassium hydroxide, calcium hydroxide and magnesium hydroxide.

The acid to be used in the ring opening is a nonoxidizing organic or inorganic acid having a dissociation constant greater than $10^{-5}$. Typical examples include hydrochloric acid, acetic acid, formic acid, trifluoroacetic acid, toluenesulfonic acid and chloroacetic acid.

Preferred reagents for cleaving the β-lactam ring are sodium acetate or trifluoroacetic acid.

The amount of acid or base should be at least one equivalent per mole of thiazoline azetidinone and is preferably an excess of 10 to 100 percent. A larger excess can be used such as when an acid is employed as the solvent, but such a large excess is unnecessary.

The thiazoles of formula V wherein R and R' are as hereinabove defined are useful an antibiotics. For example, the compound of formula V where R is phenoxyphenyl and R' is methyl is active against the fungus *Botrytis cinerea* at a concentration of 100 mcg./ml. as determined by an agar dilution test method described by Steers and Foltz in *Antibiotics and Chemotherapy* 9, p. 307 (1959). The corresponding acid is active as an antibiotic against the organism *Pseudomonas solanacearum*, strain X815, at a concentration of 100 mcg./ml. as determined by the agar dilution test.

The invention is further exemplified by the following detailed examples, which are not intended to limit the scope of the invention or claims hereof.

EXAMPLE 1

A.
2S-Chloro-3R-phenylacetamido-1-[1'-(2'',2'',2''-trichloroethoxycarbonyl)-2'-methyl-1'-propenyl]-4-azetidinone To a solution of 6.975 g. (15 mm.) of β,β,β-trichloroethyl 6-phenylacetamidopenicillinate in 300 ml. of methylene chloride at −76°C. was added 52 ml. of a 1.0 M chlorine solution (methylene chloride). This solution was stirred at −76°C. for 1½ hours and was then allowed to warm to about 0°C. Then 100 ml. of a saturated sodium bicarbonate solution was added to the reaction mixture. After gas evolution ceased, the organic layer was separated washed twice with 150 ml. portions of water and dried over MgSO₄. The solvent was then evaporated in vacuo to give 6.47 g. of the olefinic title product; nmr (CDCl₃) 125 (s, 3H), 142 (s, 3H), 217 (s, 2H), 286 (q, 2H, J = 6 and 12 Hz), 304 (q, 1H, J = 8 and 1.5 Hz), 352 (d, 1H, J = 1.5 Hz), 397 (d, 1H, J = 8 Hz), 439 Hz (s, 5 ArH); ir (CHCl₃) 1785 cm⁻¹ (azetidinone C=O), 1740 cm⁻¹ (ester C=O), 1685 cm⁻¹ (amide C=O).

B. Imino chloride of 2S-Chloro-3R-phenylacetamido-1-[1'-2'',2'',2''-trichloroethoxycarbonyl)-2'-methyl-1'-propenyl]-4-azetidinone To a solution of 2.36 g. of phosphorus pentachloride in 30 ml. of dry chloroform, 2.4 ml. of quinoline was added and the resulting suspension was cooled to −10°C. After that a solution of 4.69 g. of 2S-Chloro-3R-phenylacetamido-1-[1'-(2'',2'',2''-trichloroethoxycarbonyl)-2'-methyl-1'-propenyl]-4-azetidinone in 10 ml. of dry chloroform was added to the suspension and the solution stirred at −10°C. for 30 minutes. The solvent and POCl₃ formed were distilled off under vacuum pressure and the residue was taken up in methylene chloride and washed twice with water, and once with brine. After drying (MgSO₄) and evaporating of the solvent, the title imino chloride (4.0 g.) was obtained as an oil; nmr (CDCl₃) 126 (s, 3H), 144 (s, 3H), 236 (s, 2H), 288 (q, 2H, J = 8 and 14 Hz), 314 (d, 1H, J = 2 Hz), 364 (d, 1H, J = 2 Hz) and 421 cps (s, 5 ArH).

C. Thiazoline Azetidinone

A solution of 5.0 g. of imino chloride from part B hereinabove in 45 ml. of methylene chloride was saturated with H₂S gas and 2.8 ml. of triethylamine was added. Hydrogen sulfide gas was introduced into the solution for 1 hour at room temperature. The solvent was evaporated and the residue extracted with a mixture of 25 ml. of ethyl acetate and 25 ml. of ethyl ether. The salt of triethylamine hydrochloride (ca. 2.0 g.) was filtered off, the filtrate evaporated and the residue was chromatographed over 100 g. of silica gel eluting with benzene/ethyl acetate. Fractions (20 ml.) were collected in 18 min. period. Fractions 108–150 gave 1.45 g. of a mixture of a thiazoline azetidinone product of the formula

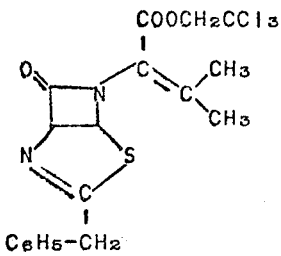

(VI)

and an unknown compound. The mixture was separated on a silica gel column eluting with cyclohexane/methylethylketone. The thiazoline azetidinone product was obtained as a colorless oil, nmr (CDCl₃) 100 (s, 3H), 135 (s, 3H), 233 (s, 2H), 296 (q, 2H, J = 8 and 11 Hz), 359 (s, azetidinone protons) and 421 cps (s, 5 arom H).

EXAMPLE 2

A mixture of 974 mg. of imino chloride from part B of Example 1, 512 mg. of potassium thioacetate, and 10 ml. of tetrahydrofuran was stirred at room temperature for 1 hour. The mixture was filtered, the filtrate evaporated to dryness, the residue dissolved in methylene chloride and the solution washed twice with water and brine, and dried (MgSO₄). After evaporation of the solvent, the oily residue was chromatographed over silica gel and the desired thiazoline azetidinone product isolated as a colorless oil. Spectral analyses showed the product to have the structure set forth in Example 1.

Similar experiments were also performed by using tetramethylammonium thioacetate or thiolacetic acid and triethylamine instead of potassium thioacetate and after workup and chromatography the compound having the product structure set forth in Example 1 was isolated.

EXAMPLE 3

Following the procedure of Example 1A. the methyl phenylacetamido penicillin ester (methyl ester of penicillin G) is treated with chlorine to open the thiazolidine ring thereof at the S₁ and C₅ bond. The resulting product is treated with phosphorus pentachloride in the presence of quinoline, as described in Example 1B. to form the imino chloride of 2-chloro-3R-phenylacetamido-1-(1'-methoxycarbonyl-2'-methyl-1'-propenyl)-4-azetidinone.

This new imino chloride is treated with hydrogen sulfide, as described in Example 1C to form the thiazoline azetidinone of the formula

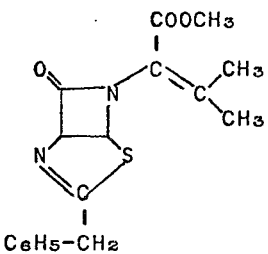

EXAMPLE 4

Following the procedure of Example 1A, the p-nitrobenzyl ester of penicillin G (phenylmethyl penicillin) is treated as described in Example 1A. to open the S₁—C₅ bond of the thiazoline ring moiety thereof. The resulting product is treated with a halogenating agent, according to the procedure described in Example 1B. to form the imino chloride of 2S-chloro-3R-phenylacetamido-1-[1'-(p-nitrobenzyloxycarbonyl)-2'-methyl-1'-propenyl]-4-azetidinone.

The new imino chloride is treated with sodium thiopropionate substantially according to the procedure described in Example 2 to form as product a thiazoline azetidinone of the formula

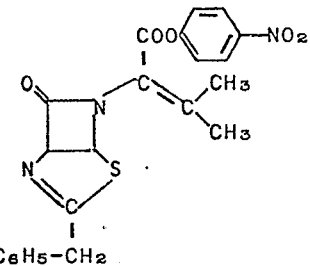

EXAMPLE 5

Following the procedure of Example 1A the p-methoxybenzyl ester of 2,6-dimethoxyphenylmethyl penicillin is treated with bromine to open the S₁—C₅-bond of the thiazolidine ring moiety thereof. The resulting product is treated with phosphorus pentabromide in place of phosphorus pentachloride as described in Example 1B to form the imino bromide of 2-bromo-3R-(2',6'-dimethoxyphenylacetamido)-1-[1'-(p-methoxybenzyloxycarbonyl)-2'-methyl-1'-propenyl]-4-azetidinone.

The resulting imino bromide is treated with hydrogen sulfide substantially as set forth in Example 1C to form as product the thiazoline azetidinone of the formula

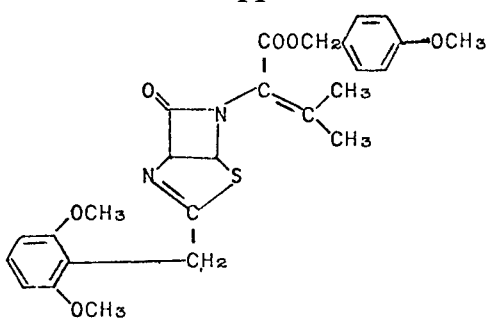

EXAMPLE 6

Following the procedure of Example 1A the benzyl ester of phenoxyisopropyl penicillin is treated with bromine to open the $S_1$—$C_5$ bond of the thiazolidine ring moiety thereof. The resulting product is treated with phosphorus pentabromide in place of phosphorus pentachloride according to the procedure described in Example 1B to form the imino bromide of 2-bromo-3R-(2'-phenoxy-2',2'-dimethylacetamido)-1-(1'-benzyloxycarbonyl-2'-methyl-1'-propenyl)-4-azetidinone.

The resulting imino bromide is treated with potassium thioacetate as described in Example 2 to form as product the thiazoline azetidinone of the formula

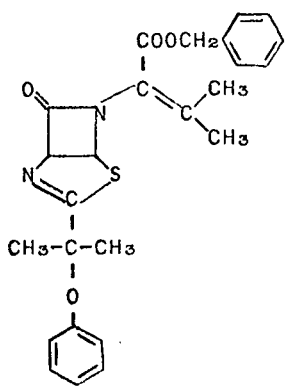

EXAMPLE 7

Following the procedure of Example 1A the methoxymethyl ester of methyl penicillin is treated with chlorine to open the $S_1$—$C_5$-bond of the thiazolidine ring moiety thereof. The resulting product is treated with phosphorus pentachloride in the presence of a base as described in Example 1B. to form the imino chloride of 2-chloro-3R-acetamido-1-[1'-(methoxymethyloxycarbonyl)-2'-methyl-1'-propenyl]-4-azetidinone.

The resulting imino chloride is treated with hydrogen sulfide as described in Example 1C to form as product the thiazoline azetidinone of the formula

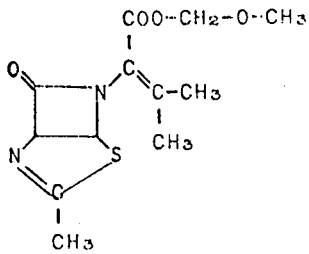

We claim:
1. A process for preparing a compound of the formula

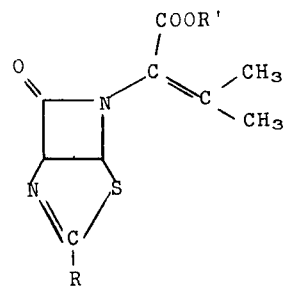

wherein R is
  a. $C_1$ to $C_8$-alkyl,
  b. $C_3$ to $C_8$cycloalkyl,
  c. $C_2$ to $C_8$-alkenyl,
  d. one of the above alkyl, cycloalkyl, or alkenyl groups substituted with $C_1$ to $C_3$-alkyloxy, chlorine, bromine, cyano or carbo-$C_1$ to $C_3$-alkyloxy;
  e.

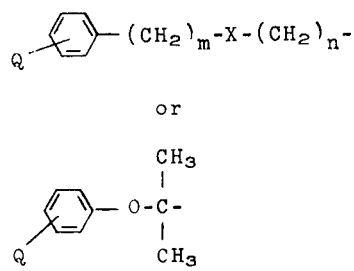

wherein in each group Q is hydrogen, chloro, bromo, $C_1$ to $C_3$-alkyl, $C_1$ to $C_3$-alkyloxy, nitro or cyano; X is oxygen or a carbon to carbon bond, $m$ is an integer of from 0 to 2, and $n$ is an integer of from 1 to 2;
and R' is hydrogen, $C_1$ to $C_4$-normal or iso-alkyl, $C_4$ to $C_6$-tert-alkyl, $C_5$ to $C_8$-tert-alkenyl, $C_5$ to $C_8$-tert-alkynyl, benzyl, methoxybenzyl, nitrobenzyl, benzhydryl, phthalimido methyl, succinimidomethyl, phenacyl, 2,2,2-trichloroethyl or methoxymethyl which comprises treating a compound of the formula

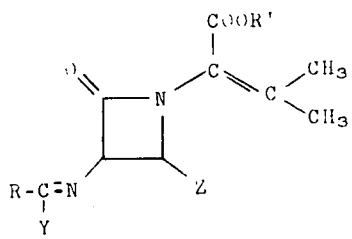

wherein R and R' are as defined above, Y and Z are each chlorine or bromine with hydrogen sulfide or a $C_1$ to $C_{12}$-thioalkanoic acid or an alkali metal or ammonium salt thereof, in the presence of a base in an aprotic solvent at a temperature below about 70° C.

2. A process as defined in claim 1 wherein R is

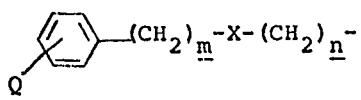

wherein Q, m, n, and X are as defined in claim 1.

3. A process as defined in claim 2 wherein hydrogen sulfide is reacted with the imino chloride of 2-chloro-3R-phenylacetamido-1-[1'-(2'',2'',2''-trichloroethoxycarbonyl)-2'-methyl-1'-propenyl]-4-azetidinone.

4. A process as defined in claim 2 wherein an alkali metal thioacetate is reacted with the iminochloride of 2S-chloro-3R-phenylacetamido-1-[1'-(2'',2'',2''-trichloroethoxycarbonyl)-2'-methyl-1'-propenyl]-4-azetidinone.

* * * * *